United States Patent
Wight et al.

(10) Patent No.: US 6,219,353 B1
(45) Date of Patent: Apr. 17, 2001

(54) MESSAGE HUB

(75) Inventors: Mark Stephen Wight, Ottawa; Kalamaljit S. Masonde; Mohammed I. Tatar, both of Kanata; Stephane Gagnon, Ottawa; Peter J. Barry, Kanata, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/098,951

(22) Filed: Jun. 17, 1998

(51) Int. Cl.[7] .................................................. H04L 12/28
(52) U.S. Cl. ......................... 370/425; 370/446; 370/462
(58) Field of Search ................................... 370/446, 425, 370/462

(56) References Cited

U.S. PATENT DOCUMENTS

| | | | |
|---|---|---|---|
| 4,628,311 | 12/1986 | Milling | 340/825 |
| 4,630,254 | * 12/1986 | Tseng | 370/412 |
| 4,656,627 | 4/1987 | Hasley et al. | 370/85 |
| 4,982,400 | * 1/1991 | Elbersole | 370/407 |
| 4,998,244 | 3/1991 | Lee et al. | 370/85 |
| 5,005,167 | * 4/1991 | Arthurs et al. | 359/135 |
| 5,469,439 | * 11/1995 | Thaler et al. | 370/437 |
| 5,479,395 | 12/1995 | Goodman et al. | 370/16 |
| 5,550,836 | * 8/1996 | Albrecht et al. | 370/461 |

FOREIGN PATENT DOCUMENTS 2015217 9/1979 (GB) ............................. H04L/5/22

* cited by examiner

Primary Examiner—Hassan Kizou
Assistant Examiner—Thien Tran

(57) ABSTRACT

A message hub is provided for use in a message communication system having a plurality of nodes connected to the message hub by a data communication medium for inter-node messaging. The message hub operates in a scheduling phase and a transmission phase. In the scheduling phase, request receiving means receives a messaging request signal is received from each node. In accordance with the messaging request signal, selecting means selects a selected node in the scheduling phase. Granting means generates a grant signal to the selected node for allowing the selected node to transmit a message to the message hub on the data communication medium. The granting means also generates a listen signal to the other nodes for commanding the other nodes to listen to the data communication medium. The message hub enters in the transmission phase in which message receiving means receives a message transmitted from the selected node on the data communication medium. The message includes an end of message signal at the end of the message. The message is then broadcasted by broadcasting means to all nodes on the data communication medium so as to enter into the scheduling phase by broadcasting the end of message signal.

34 Claims, 4 Drawing Sheets

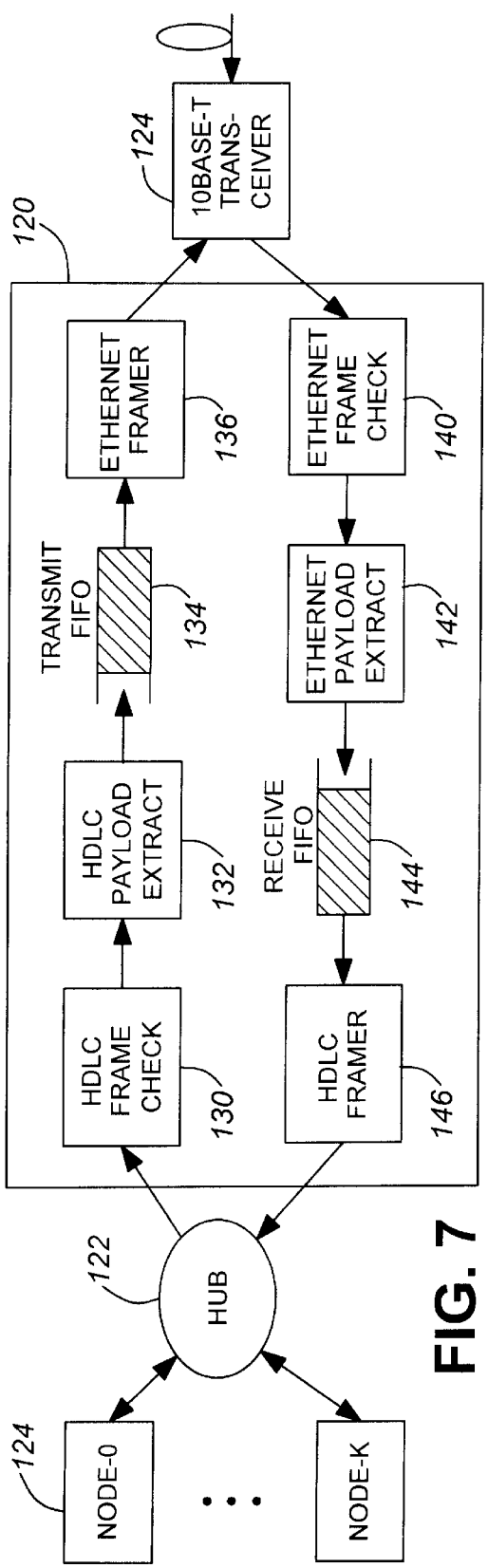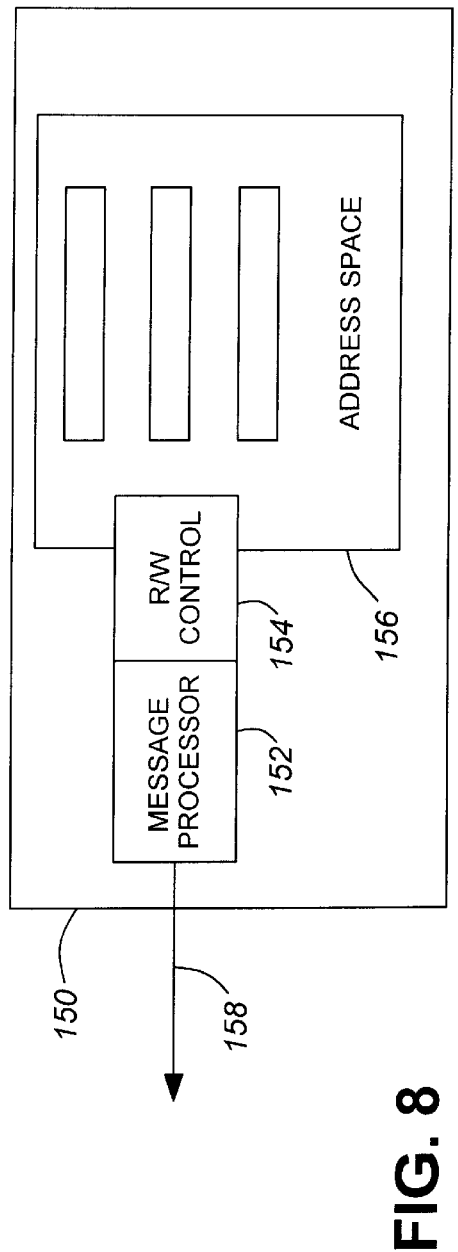
FIG. 7
FIG. 8

MESSAGE HUB

This invention relates to a message hub for messaging between a plurality of nodes connected by a data communication medium, and a message communication system using the message hub.

BACKGROUND OF THE INVENTION

There are many of different Local Area Network (LAN) technologies. Ethernet is one of the most commonly used LAN technologies. Ethernet uses hub/bus topology. In those systems using bus topology, a plurality of processor based circuit packs or nodes share a common data communication medium, and accordingly, some form of mechanism is required for controlling access to the data communication medium by each node.

The medium access control protocol used by Ethernet is Carrier Sense Multiple Access/Collision Detection (CSMA/CD), in which each node monitors the data communication medium and transmits a message when the medium is idle. If two or more nodes attempt to transmit at the same time, a collision occurs. If a collision is detected during the transmission, each node ceases transmission and re-transmit after waiting for random amount of time.

This CSMA/CD system works well while the medium is relatively quiet and there are relatively a few collisions occurring. However, when the medium becomes busy, excessive collisions reduce the overall throughput of the network. Although this system does not favour any node and all nodes can have access to the medium in theory, in worst cases, some nodes may not be able to access the medium due to excessive collisions.

In addition, Ethernet uses transformers to exchange data between nodes, which is extra circuitry not needed for intra system communication.

U.S. Pat. No. 5,479,395 issued on Dec. 26, 1995 to Goodman et al and assigned to the same assignee as the present invention discloses a serial bus system which operates in an arbitration or scheduling phase and a transmission phase. The system uses a set of four signals, an arbitration clock, a data clock, an arbitration signal and a slot signal. All nodes are connected to those four signals. In order to ensure equal access to all nodes wishing to transmit, each node is provided with an access control means which uses the arbitration signal to ensure only one node accesses the bus, and uses the slot signal to identify the point at which a node has "won" control of the bus so that the other nodes can "win" before the node which has "won". Use of four signals and the access control means add complexity in each node. Also, this system does not allow different levels of priority in transmission requests.

Accordingly, there is a need for an improved message communication system which is simple and provides reliable access for each node to the medium, and which allows use of different levels of priority and easy communication with nodes in other network systems.

SUMMARY OF THE INVENTION

An object of the present invention is to provide a message communication system which performs efficient scheduling of access to a data communication medium by a plurality of nodes connected to the medium using simple signals and circuitry.

To this end, the present invention uses a message hub which operates in a scheduling phase and a transmission phase. The system schedules the access of each node to a data communication medium without requiring any special scheduling signal.

In accordance with an aspect of the present invention, there is provided a message hub for use in a message communication system having a plurality of nodes connected to the message hub by a data communication medium for inter-node messaging. The message hub operates in a scheduling phase and a transmission phase. In the scheduling phase, request receiving means receives a messaging request signal is received from each node. In accordance with the messaging request signal, selecting means selects a selected node in the scheduling phase. Granting means generates a grant signal to the selected node for allowing the selected node to transmit a message to the message hub on the data communication medium. The granting means also generates a listen signal to the other nodes for commanding the other nodes to listen to the data communication medium. The message hub enters in the transmission phase in which message receiving means receives a message transmitted from the selected node on the data communication medium. The message includes an end of message signal at the end of the message. The message is broadcasted by broadcasting means to all nodes on the data communication medium so as to enter into the scheduling phase by broadcasting the end of message signal.

BRIEF DESCRIPTION OF THE DRAWINGS

The invention will be further understood from the following description with reference to the drawings in which:

FIG. 7 is a block diagram of an embodiment of a system interface used by the present invention.

FIG. 8 is an embodiment of a message hub interface used by the present invention.

DETAILED DESCRIPTION OF THE PREFERRED EMBODIMENTS

Figure 1:
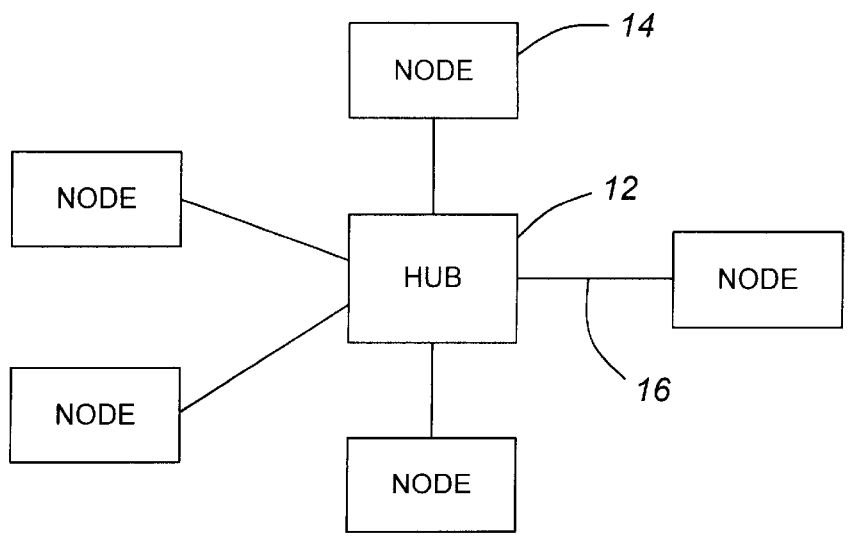
FIG. 1 is a diagram showing a message communication system of an embodiment of the present invention.

FIG. 1 shows an embodiment of a message communication system 10 in which the present invention is adapted. The message communication system 10 comprises a message hub 12 and a plurality of nodes 14 connected to the message hub 12 by a data communication medium 16 for messaging between the nodes. The data communication medium 16 is a data medium shared by the plurality of nodes 14, and accordingly, the system requires control of access to the medium 16 by each node 14. The message hub 12 of the present invention performs the scheduling by selecting a node and granting it transmission of its message, as described below.

The use of the message hub 12 limits the geometry of the message communication system 10 to one that is relatively small. This limited intra-system scope of the message hub offers short signal transmit time and negligible delays in signal transmission. The present invention uses LAN concepts and combines them with techniques possible within the small geometry of the system, which was not possible within a distributed geometry of a LAN because delays in signal transmission are more significant in such a distributed geometry.

The system is also possible to be used in larger geometries but only begins to demonstrate efficiency when multiple nodes are waiting and advanced scheduling is performed during a transmission phase, and scheduling results arrive soon after a message broadcasted in the previous transmission phase, as described below.

The message hub of the present invention operates in two phases: a scheduling phase for selecting a node and granting the selected node transmission of a message to the message hub; and a message transmission phase for receiving the message from the selected node and broadcasting the message to all nodes. Such scheduling is advantageous over collision sensing used in Ethernet because the scheduling can provide each node with guaranteed access to the medium.

The message includes an end of message signal at the end of message. In the end of the transmission phase, the message hub broadcasts the end of message signal, which brings the system to enter into the next scheduling phase. Thus, the system does not require any special scheduling signal or any special path to transmit such a signal. This simplifies the system and shortens the time required for transition from the transmission phase to the scheduling phase.

It is preferable that a unique idle pattern of all "1"s is used by the interface hardware of each node to recognize the end of the transmission phase. By using the idle pattern, the system remains stable and is self aligning even with failures where a flag code used by a message terminator, e.g. a message processor, of each node to recognize the end of a valid message is not transmitted or corrupted.

The scheduling phase and the data transmission phase may be separated in a system.

In an application with LAN size similar to Ethernet, the selection portion of the scheduling phase may overlap with the transmission phase so as to perform advanced scheduling during the transmission phase. The nodes which are not transmitting a message send their requests to the message hub on their transmitting lines during a transmission phase. During this transmission phase, while broadcasting a message received from a previously selected node, the message hub can select a node for granting transmission in the next transmission phase. This advanced scheduling enhances transmission efficiency because as soon as the transmission phase is over, the message hub can send a grant signal to the node and a listen signal to the other nodes during the granting portion of the scheduling phase.

The use of the message hub also enables centralization of scheduling, which improves the fault tolerance of the message communication system. It also allows more nodes and longer connection lengths of the system without involving problems due to signal transmission delays.

When a node is not transmitting a message, the node sends to the message hub a messaging request signal. The messaging request signal represents the status of the messaging request, such as a level of priority of the messaging request or no request.

During the scheduling phase, the message hub receives the messaging request signal from each node, and selects a node to grant it message transmission in accordance with the messaging request signals received from the nodes. The message hub sends the selected node a grant signal, and a listen signal to the nodes other than the selected node. The scheduling uses the same communication medium as that on which messages are transmitted.

The system now enters into the data transmission phase. The selected node transmits a message including an end of message signal to the message hub on the data communication medium in response to the grant signal. The other nodes start to listen to the data communication medium in response to the listen signal.

As receiving the message from the selected node, the message hub broadcasts the message to all nodes including the selected node. The transmission phase is terminated by receiving and broadcasting the end of message signal, e.g. the idle code, and the system enters into the next scheduling phase. That is, broadcasting of the end of message signal functions as notification of the entry into the next scheduling phase.

It is preferable for simplicity of circuits in each node that the message hub distributes a clock signal to each node. This is possible in the present invention because delays in signal transmission in the system are negligible.

The present system permits fair and round rotation scheduling using a plurality of levels of priority for messaging requests. The system may define any number of levels of priority as desired. For simplicity of description, in the following embodiment, the message hub defines two levels of priority, high and low.

During the scheduling phase, each node can assert a high priority request, a low priority request, or no request. Each node sends a messaging request signal which indicates the asserted status of the messaging request, namely, a high priority request, a low priority request or no request.

Each node preferably truncates lengths of massages so that a message of a higher priority request has a length shorter than that of a message of a lower priority request. In this embodiment, high priority messages are restricted to 128 bytes in length, and low priority messages are restricted to 2 Kbytes.

Figure 2:
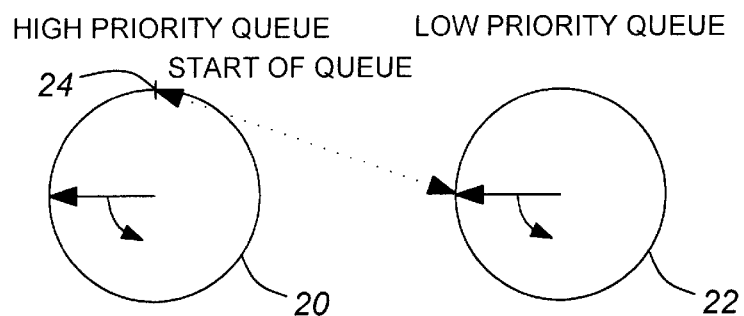
FIG. 2 is a diagram showing an embodiment of priority queues used by the present invention.
Figure 3:
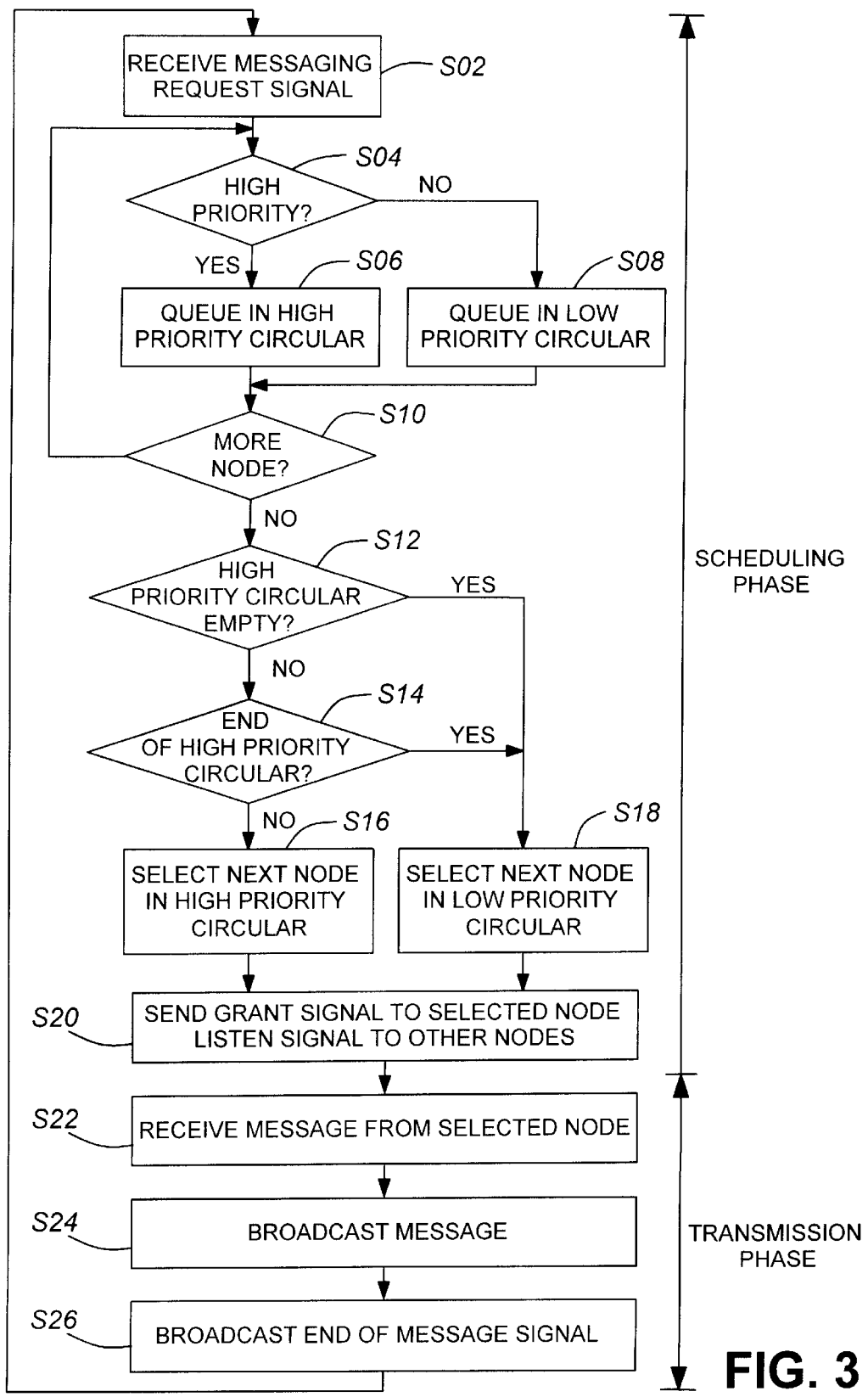
FIG. 3 is a flow chart showing the steps of the message hub using the embodiment shown in FIG. 2.

As shown in FIGS. 2 and 3, the message hub receives a messaging request signal from each node (S02) and arranges messaging requests in a pair of circular queues comprising high priority circular queue 20 and low priority circular queue 22. Each node has a corresponding specific location in the queues. That is, if the request is a high priority request (S04), the message hub queues the request in a respective location of the node in the high priority circular queue 20 (S06), and if it is not a high priority request (S04), the message hub queues the request in a respective location of the node in the low priority circular queue 22 (S08). When the message hub arranges messaging requests in the queues, the message hub skips the locations for those nodes which are not requesting transmission and whose messaging request signals indicate no request. The message hub receives the messaging request signal from each node by repeating the above steps (S10).

The message hub processes high priority requests first. A low priority request is processed when the high priority queue 20 is empty or when request processing reaches the end of the high priority queue 20. The message hub checks if the high priority circular queue is empty (S12). If it is not empty, it further checks if the request processing reached the end of the high priority circular queue (S14). If it has not reached the end, it selects the next node in the high priority circular queue (S16). If the high priority circular is empty (S12) or if the request processing reached the end of the high priority circular queue (S14), the message hub selects the next node in the low priority circular queue (S18).

Then, the message hub sends a grant signal to the selected node and a listen signal to the other nodes (S20).

The message hub enters into a transmission phase. In response to the grant signal, the selected node transmits its message which is received by the message hub (S22). The message hub broadcasts the received message to all nodes (S24). The broadcasting of the end of message signal included in the message becomes the entry to the next scheduling phase (S26), and the system cycle goes back to the beginning of FIG. 3.

In a worst case scenario, with the high priority queue becomes never empty, one low priority message is processed for every full rotation through the high priority queue 20 from the start of queue 24. Even in this case, since high priority messages are restricted to 128 bytes, the majority of bandwidth remains available to low priority messages. As a result, the system is stable even when a node is continually requesting to send high priority messages.

Accordingly, the limitation of high priority messages to a maximum length shorter than that of low priority messages in combination with the circular queuing mechanism provides each node with guaranteed access to the medium. Also, the system operation cannot be prevented by a single node failure.

It is preferable for the system to use High Level Data Link Control (HDLC) coding for functions of start of message flag, destination address recognition, and Cyclic Redundancy Check(CRC) error checking.

In HDLC coding, zero code suppression creates a unique flag type 7E and a unique idle code eight or more consecutive "1"s indicating an end of message transmission. This consecutive "1"s is preferably used as the end of message signal in this invention to move from the transmission phase to the scheduling phase. Thus, no specific signal is required for transition from the transmission phase to the scheduling phase. Sending of constant "1"s between messages also contributes system stability and allows re-synchronization of each node.

The data communication medium may be three controlled impedance back plane Printed Circuit Board (PCB) tracks for each communication card of each node. Signals to each card from the hub are clock and transmission data. The signals from each card to the hub is transmission data.

Figure 4:
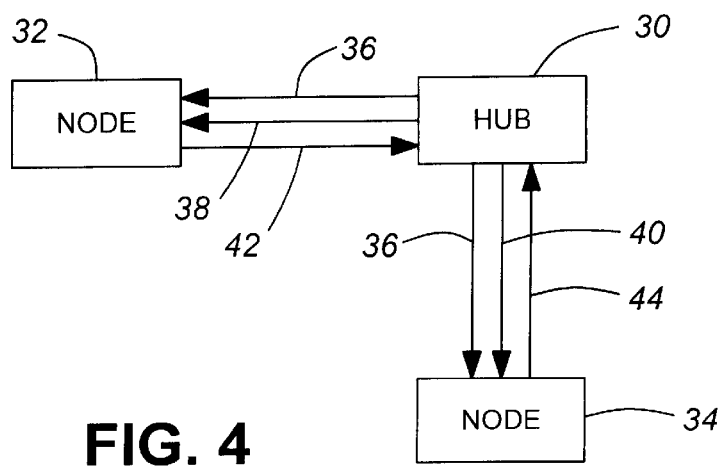
FIG. 4 is a diagram showing an example of signal transmission in a message communication system of the present invention.
Figure 5:
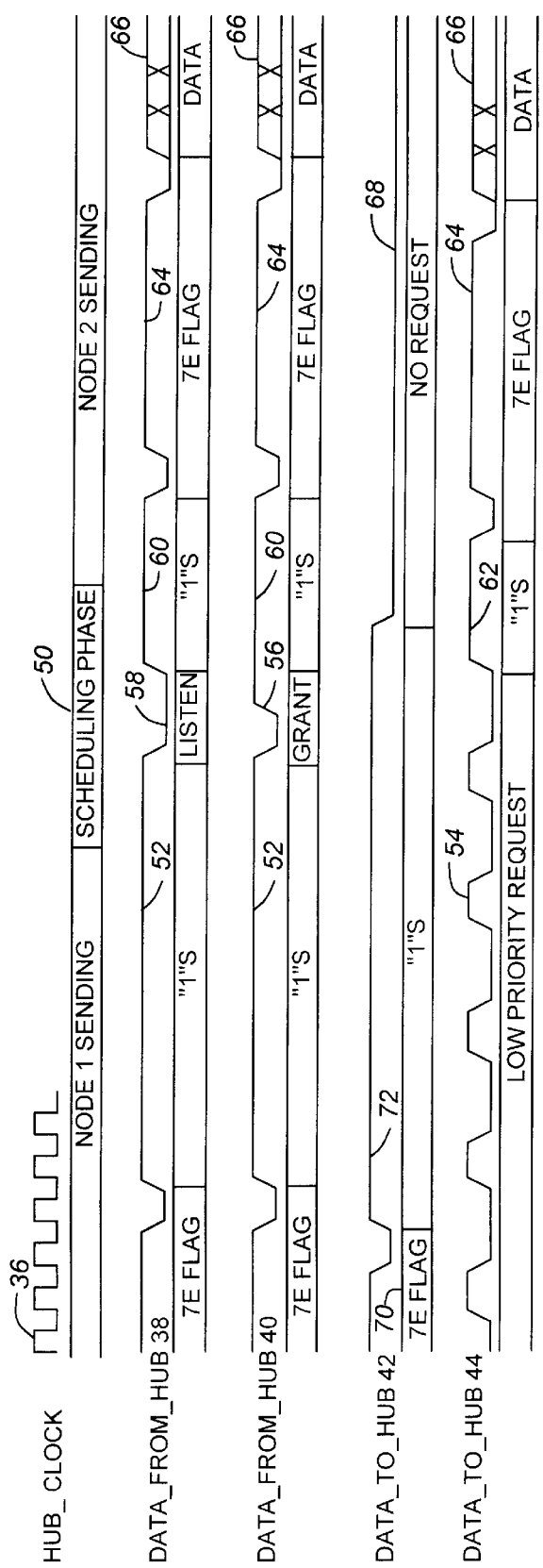
FIG. 5 is a diagram showing transmission of the signals in the system shown in FIG. 3.

Referring to FIGS. 4 and 5, an example of signals between message hub 30 and two nodes 32 and 34 is described. The connection between a message hub 30 and each node 32, 34 consists of three signals: a clock signal, Hub_Clock 36, sourced by the message hub and sent to each node; a first data signal, Data_From_Hub 38, 40, sourced by the message hub and sent to each node; and a second data signal, Data_To_Hub 42, 44, sourced by each node and sent to the message hub.

When a node is not transmitting a message, the node sends on Data_To_Hub a repeating code: "000000 . . ." when it has no request; "001001 . . ." when it has a low priority request; or "011011 . . ." when it has a high priority request. In this example, node 34 transmits a messaging request signal 54 indicating a low priority request to the message hub 30 on Data_To_Hub 44.

During the scheduling phase, the message hub 30 receives the messaging request signal, and selects node 2 to grant it transmission of its message in response to the messaging request signal.

The scheduling phase is terminated when the message hub sends on Data_From_Hub: a grant signal "00" to the selected node and a listen signal "01" to the other nodes. In this example, the message hub 30 sends a grant signal "00" 56 to node 34 on Data_From_Hub 40; and a listen signal "01" 58 to node 32 on Data_From_Hub 38.

In the message transmission phase, the selected node sends its message on Data_To_Hub. In this example, node 34 transmits on Data_To_Hub 44 a message comprising a start of message 7E Flag 64 and data 66 after an idle code 62. Node 32 starts to listen to Data_From_Hub 38 and sends no request 68 on Data_To_Hub 42.

As receiving the message from node 34, the message hub 30 broadcasts the received message 64, 66 to each node on each Data_From_Hub 38,40 after an idle code 60.

The beginning of the chart of FIG. 5 shows an end of message transmission 68 from node 32. Message transmission 70 ends with an end of message signal 72 comprising more than eight consecutive "1"s. The message hub 30 broadcast this consecutive "1"s to node 32 on Data_From_Hub 38 and to node 34 on Data_From_Hub 40. In HDLC code, more than six consecutive "1"s will not be transmitted as HDLC coded data during the message phase. Thus, the detection of eight or more consecutive "1"s indicates that the message hub is in the next scheduling phase. All nodes which were disallowed to transmit their messages in the previous scheduling phase discover a valid state to request transmission when the system enters into the next scheduling phase.

Every node re-synchronizes upon detection of the end of message signal, which achieves the unconditional stability of the message communication system.

The system may be provided with a high value pull-up resistor for each Data_To_Hub signal at the message hub, so that the messaging request signal remains high or all "1"s when a node or a communication card of the node is not present. In other words, detection of all "1"s during the scheduling phase indicates that a node or a card of a node is not present.

In order to maintain stability of the system, it is preferable to provide several hardware timer settings which allows correct communication during state transitions. Examples of preferred timer settings are as follows:

HUB: minimum delay from an end of message to issuing grant/listen signals.

HUB: delay from issuance of grant/listen signals to message broadcast. This may be rendered by sending an idle code 60 of "1"s in the interim as shown in FIG. 5.

NODE: delay from detection of a grant signal to sending the first bit of the message. This may be rendered by sending an idle code 62 of "1"s in the interim as shown in FIG. 5.

NODE: delay from detection of grant/listen signals to beginning of search for end of message.

NODE: minimum delay from completion of message transmission to sending a next message request.

As the system of the present invention does not use collision sensing for controlling access of each node, the system may perform loopback system testing using loopback messages.

It is preferable that all nodes share a common ground, so that signals do not have to be transformer coupled in order to be exchanged between nodes as in Ethernet. Source terminated low voltage complementary metal-oxide semiconductor (CMOS) drivers can be used instead of transformers. Thus, the circuits of the nodes become simple. The message hub of the present invention may add external series resisters to match the CMOS drivers to the impedance of the system tracks.

Figure 6:
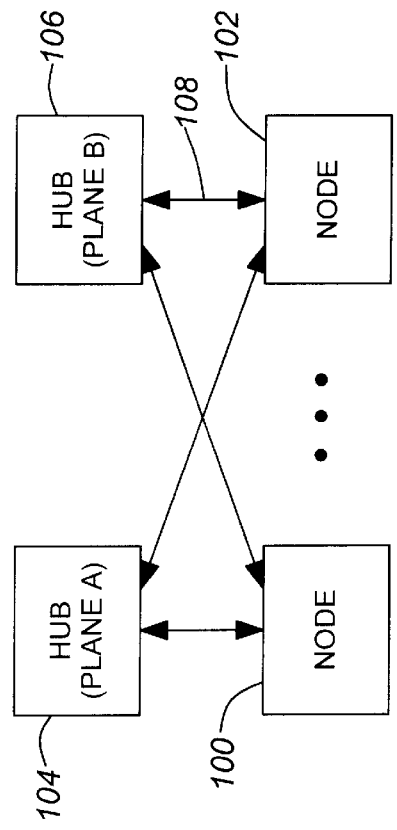
FIG. 6 is a diagram showing an embodiment of dual plane architecture used by the present invention.

As shown in FIG. 6, it is preferable that the system uses two message hubs to construct a dual plane point to point hubbing architecture for optimum fault detection, isolation, and tolerance. Each node 100, 102 is connected to a message hub 104 of plane A and a message hub 106 of plane B with a point to point message hub connection 108.

A node detects that a plane has failed or is inactive when the Hub_Clock signal is not present or is running on a reduced frequency. Dual plane communication provides tolerance to a message hub or a link failure. The point to point architecture with redundant paths assists with fault isolation.

Dual plane operation also provides the ability to replace/upgrade cards of a message hub while the system is operational.

In order for the message communication system to easily communicate with different communication systems, such as Ethernet systems, or in order to accommodate nodes that are farther away from the system, it is preferable that the message hub is made to look like such different systems to higher layer protocols of the different systems.

To this end, the message hub may include one or more system interfaces.

FIG. 7 shows an embodiment of a system interface 120 and its internal architecture for communicating with an Ethernet 10BASE-T system. A message hub 122 is connected to a plurality of nodes 124 and the system interface 120. As far as the message hub 122 is concerned, each one of such a system interface 120 can be handled like any other nodes 124. In other words, all internal and long reach nodes can use the same scheduling scheme described above.

In the transmit direction from the message hub 122, a message comprising HDLC frames including a destination address and a message from the message hub 122 is bridged to the 10BASE-T transceiver 124 of the Ethernet system by the interface 120. The interface 120 bridges the message by checking the HDLC frames by HDLC frame check circuitry 130; extracting HDLC frame payload and filtering the destination address by HDLC payload extract circuitry 132; queuing the message in a transmit First-In-First-Out (FIFO) register 134; and framing the message in Ethernet frames by Ethernet framer 136. The queuing space of transmit FIFO register 134 is provided so that the Ethernet link can handle the message hub bandwidth on average.

In the receive direction, Ethernet frames including a destination address and a message from the 10BASE-T transceiver 124 are bridged to the message hub 122 through the system interface 120. The system interface 120 bridges the message by checking the Ethernet frames by Ethernet frame check circuitry 140; extracting Ethernet frame payload and filtering the destination address by Ethernet payload extract circuitry 142; queuing the message in a receive FIFO register 144; and framing the message in HDLC frames by HDLC framer 146. The queuing space of receive FIFO register 144 is provided to alleviate the message hub access latency.

Thus, the message hub may be extended to map messages directly into the Ethernet 10BASE-T system for inter-system communication.

Commonly used system architectures for LAN systems comprise of a node having a main processor card surrounded by various peripheral nodes having peripheral cards. There is usually a need for control and status information to be conveyed between the main processor card and its peripheral cards. Various bus technologies can be used to convey the information at the expense of board area, backplane connector pins and complexity associated with each interface added to a system.

The message hub of the present invention allows a processor card of a node to control processor-free cards of its peripherals. This is possible because of simplicity of physical layers and data link control layer frame of the system which enables guaranteed minimum bandwidth for all nodes and high priority messaging using short frames and low latency.

In order for the processor card of a node to access control and status registers of peripheral cards through the message hub, it is preferable that the peripheral cards which are not equipped with a dedicated communication processor are provided with a message hub interface. The message hub interface is responsible for decoding and processing the messages received from the message hub.

FIG. 8 shows a preferred embodiment of a message hub interface 150 for a peripheral card. The message hub interface 150 comprises message processing circuitry 152, read/write control circuitry 154 and address space circuitry 156. The message processing circuitry 152 is connected to through a node to a message hub (not shown) by a data communication medium 158.

A message contains a read/write message type, an address (or a set of addresses), write data (or a set of write data) and CRC. A write message sent by any node via the message hub to the peripheral is received by the message processing circuitry 152 and validated for the destination address and CRC. The address(es) and data are passed to the read/write control circuitry 154 which writes the data to the specified addresses in the address space circuitry 156. In this embodiment, the message is a User Datagram Protocol (UDP) datagram and the sender expects no response from the peripheral.

A status request message contains a message type, an address or a set of addresses, data and CRC. The message type of a status request message is "read". A status request message sent by the node connected to the peripheral via the message hub to the peripheral is received by the message processing circuitry 152 and validated for the correct destination address and CRC. The read/write control circuitry 154 reads the specified addresses and passes the data to the message processing circuitry 152. The message processing circuitry 152 takes the original message; exchanges source and destination Media Access Control (MAC) and Internet Protocol (IP) addresses, exchanges UDP addresses; appends the read data; recalculates the CRC to create a returning message; and sends the returning message to the message hub for broadcasting. The exchange of addresses returns the status message to the original node which sent the query status message. In this embodiment, the read and returning status message are both UDP datagrams and the senders do not expect any acknowledgment from the recipients.

Thus, the present invention allows direct hardware control and status reporting through the message communication system of the present invention.

The message hub of the present invention may be used to provide messaging between 64 nodes.

The message communication system of the present invention is an inexpensive, simple, reliable intra-system local area network. It also allows easy connections with other systems for inter-system communication.

What is claimed is:

1. A message hub for use in a message communication system having a plurality of nodes connected to the message hub by a data communication medium for inter-node messaging, the message hub operating in a scheduling phase and a transmission phase and comprising:

request receiving means for receiving in the scheduling phase a messaging request signal from each node;

selecting means for selecting a selected node in the scheduling phase in accordance with the messaging request signal;

granting means for generating in the scheduling phase a grant signal to the selected node for allowing the selected node to transmit a message to the message hub on the data communication medium, and a listen signal to the other nodes for commanding the other nodes to listen to the data communication medium;

message receiving means for receiving in the transmission phase a message transmitted from the selected node on the data communication medium, the message including an end of message signal at the end of the message; and broadcasting means for broadcasting the message to all nodes on the data communication medium in the transmission phase so as to enter into the scheduling phase by broadcasting the end of message signal.

2. A message hub as claimed in claim 1 wherein the messaging request signal indicates a level of priority of a messaging request or no request.

3. A message hub as claimed in claim 2 wherein the lengths of massages are limited so that a message of a higher priority request has a length shorter than that of a message of a lower priority request.

4. A message hub as claimed in claim 3 further comprising:

means for providing a plurality of circular queues, each queue associated with each level of priority of messaging requests and having a respective location for each node; and means for queuing each messaging request in the respective location of the node in a circular queue associated with the level of priority of the messaging request.

5. A message hub as claimed in claim 4 further comprising request processing means for processing a lower priority request when a higher priority circular queue is empty or when request processing reaches the end of the higher priority circular queue.

6. A message hub as claimed in claim 1 further comprising timing distribution means for generating a clock signal and transmitting the clock signal to each node.

7. A message hub as claimed in claim 1 further comprising node detection means for detecting the presence of each node which can communicate with the message hub.

8. A message hub as claimed in claim 1 further comprising a communication system interface, as an additional node connected to the message hub, for communicating with nodes in a different communication system which is outside the message communication system.

9. A message hub as claimed in claim 8 wherein the communication system interface maps information directly into the different communication system so as to allow communication between nodes in the message communication system and in the different communication system.

10. A method for scheduling of messaging in a message communication system having a message hub and a plurality of nodes connected to the message hub by a data communication medium, the message hub operating in a scheduling phase and a transmission phase, the method comprising the steps of:

receiving by the message hub in the scheduling phase a messaging request signal from each node;

selecting a selected node by the message hub in the scheduling phase in accordance with the messaging request signal;

generating and sending by the message hub in the scheduling phase a grant signal to the selected node for allowing the selected node to send a message to the message hub on the data communication medium, and a listen signal to the other nodes for commanding the other nodes to listen to the data communication medium;

transmitting in the transmission phase a message to the message hub from the selected node on the data communication medium, the message including an end of the message signal at the end of the message; and broadcasting the message by the message hub to all nodes on the data communication medium in the transmission phase so as to enter into the scheduling phase by broadcasting the end of message signal.

11. A method for scheduling as claimed in claim 10 wherein in the selecting step, the message hub selects the selected node using a level of priority of the messaging request indicated by the messaging request signal.

12. A method for scheduling as claimed in claim 11 further comprising the step of truncating by each node the lengths of massages so that a message of a higher priority request has a length shorter than that of a message of a lower priority request.

13. A method for scheduling as claimed in claim 12 further comprising the step of queuing by the message hub each messaging request in a respective location for each node in a circular queue associated with the level of priority of the messaging request.

14. A method for scheduling as claimed in claim 13 further comprising the step of processing a lower priority request when a higher priority circular queue is empty or when request processing reaches the end of the higher priority circular queue.

15. A method for scheduling as claimed in claim 10 wherein the step of receiving and the step of selecting are carried out during broadcast of a message received from a node selected in a previous scheduling phase.

16. A method for scheduling as claimed in claim 10 further comprising the step of generating a clock signal and transmitting the clock signal to each node.

17. A method for scheduling as claimed in claim 10 further comprising the step of detecting the presence of each node which can communicate with the message hub.

18. A method for scheduling as claimed in claim 10 further comprising the step of communicating through a communication system interface with nodes in a different communication system which is outside the message communication system.

19. A method for scheduling as claimed in claim 18 wherein the step of communicating with nodes in the different communication system comprising the step of mapping information directly into the different communication system so as to allow communication between nodes in the message communication system and in the different communication system.

20. A message communication system comprising:

a data communication medium;

a plurality of nodes, each node having:

requesting means for issuing a messaging request signal on the data communication medium, the messaging request signal indicating status of a request for transmission of a message including an end of message signal at the end of the message;

transmitting means for transmitting the message on the data communication medium; and receiving means for receiving messages transmitted on the data communication medium; and a message hub connected to each node by the data communication medium, the message hub operating in a scheduling phase and a transmission phase, the message hub having:

request receiving means for receiving in the scheduling phase the messaging request signal from each node;

selecting means for selecting a selected node in the scheduling phase in accordance with the messaging request signal;

granting means for generating in the scheduling phase a grant signal to the selected node for allowing the selected node to send a message to the message hub on the data communication medium, and a listen signal to the other nodes for commanding the other nodes to listen to the data communication medium;

message receiving means for receiving in the transmission phase a message transmitted from the selected node on the data communication medium; and broadcasting means for broadcasting the message to all nodes on the data communication medium in the transmission phase so as to enter into the scheduling phase by broadcasting the end of message signal.

21. A message communication system as claimed in claim 20 wherein the messaging request signal issued by each node indicates a level of priority of the messaging request of the node.

22. A message communication system as claimed in claim 21 wherein each node further comprises means for truncating the lengths of massages so that a message of a higher priority request has a length shorter than that of a message of a lower priority request.

23. A message communication system as claimed in claim 22 wherein the selecting means of the message hub comprises means for queuing each messaging request in a circular queue associated with the level of priority of the messaging request and having a respective location for each node.

24. A message communication system as claimed in claim 23 wherein the selecting means of the message hub further comprises means for processing a lower priority request when a higher priority queue is empty or when request processing reaches the end of the higher priority queue.

25. A message communication system as claimed in claim 20 wherein each node further comprise means for detecting the broadcasted end of message signal, and re-synchronizing each node.

26. A message communication system as claimed in claim 20 wherein the message hub further comprises means for generating a clock signal and transmitting the clock signal to each node.

27. A message communication system as claimed in claim 20 wherein the message hub further comprises means for detecting the presence of each node which is capable of communicating with the message hub.

28. A message communication system as claimed in claim 20 wherein the data communication medium comprises three connection signals between the message hub and each node.

29. A message communication system as claimed in claim 20 wherein each node has a complementary metal-oxide semiconductor (CMOS) driver.

30. A message communication system as claimed in claim 20 further comprises peripheral devices connected to one of the nodes and having a message hub interface, and each node controlling its peripheral devices through the message hub.

31. A message communication system as claimed in claim 20 wherein the system further comprises another message hub and has a dual point to point hubbing architecture.

32. A message communication system as claimed in claim 20 wherein the message hub further comprises, as an additional node, a communication system interface for communicating with nodes in a different communication system which is outside the message communication system.

33. A message communication system as claimed in claim 32 wherein the communication system interface maps information directly into the different communication system so as to allow communication between nodes in the message communication system and in the different communication system.

34. A message communication system comprising:

a data communication medium having three connection signals;

a plurality of nodes, each node having:

a complementary metal-oxide semiconductor (CMOS) driver to couple to the data communication medium;

requesting means for issuing a messaging request signal on the data communication medium, the messaging request signal indicating a level of priority of a messaging request for transmission of a message including an end of message signal at the end of the message;

means for truncating the lengths of massages so that a message of a higher priority request has a length shorter than that of a message of a lower priority request;

transmitting means for transmitting the message on the data communication medium;

receiving means for receiving messages transmitted on the data communication medium; and means for detecting an end of message signal broadcasted on the communication medium and re-synchronizing the node in the scheduling phase;

a message hub connected to each node by the data communication medium, the message hub operating in a scheduling phase and a transmission phase, the message hub having:

request receiving means for receiving in the scheduling phase the messaging request signal from each node;

selecting means for selecting a selected node in the scheduling phase in accordance with the messaging request signal, the selecting means having:

means for queuing each messaging request in a circular queue associated with the level of priority of the messaging request and having a respective location for each node; and means for processing a lower priority request when a higher priority queue is empty or when request processing reaches the end of the higher priority queue;

granting means for generating in the scheduling phase a grant signal to the selected node for allowing the selected node to send a message to the message hub on the data communication medium, and a listen signal to the other nodes for commanding the other nodes to listen to the data communication medium;

message receiving means for receiving in the transmission phase a message transmitted from the selected node on the data communication medium;

broadcasting means for broadcasting the message to all nodes on the data communication medium in the transmission phase so as to enter into the scheduling phase by broadcasting the end of message signal;

means for generating a clock signal and transmitting the clock signal to each node; and means for detecting the presence of each node which is capable of communicating with the message hub;

a plurality of peripheral devices, each connected to one of the nodes and having a message hub interface, each peripheral device being controlled by a respective node through the message hub; and a communication system interface, as an additional node, for communicating with nodes in a different communication system which is outside the message communication system, the communication system interface mapping information directly into the different communication system so as to allow communication between nodes in the message communication system and in the different communication system.

* * * * *

UNITED STATES PATENT AND TRADEMARK OFFICE
CERTIFICATE OF CORRECTION

PATENT NO. : 6,219,353 B1
DATED : April 17, 2001
INVENTOR(S) : Mark Stephen Wight; Kalamaljit S. Masonde; Mohammed I. Tatar; Stephane Gagnon; Peter J. Barry It is certified that error appears in the above-identified patent and that said Letters Patent is hereby corrected as shown below:

Claim 3,
"lengths of massages" should be "lengths of messages"

Claim 22,
"lengths of massages" should be "lengths of messages"

Claim 34,
"lengths of massages" should be "lengths of messages".

Signed and Sealed this

Eleventh Day of December, 2001

Attest:

*Attesting Officer*

NICHOLAS P. GODICI
*Acting Director of the United States Patent and Trademark Office*